United States Patent
Xu et al.

(10) Patent No.: US 12,301,907 B2
(45) Date of Patent: May 13, 2025

(54) MANAGING TRANSMISSION RESOURCES

(71) Applicant: Comcast Cable Communications, LLC, Philadelphia, PA (US)

(72) Inventors: Kan Xu, Beijing (CN); Qiang Wang, Beijing (CN); Xue Zhang, Beijing (CN); Lei Wu, Beijing (CN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/750,997

(22) Filed: May 23, 2022

(65) Prior Publication Data
US 2023/0336805 A1    Oct. 19, 2023

Related U.S. Application Data

(63) Continuation of application No. PCT/CN2022/086585, filed on Apr. 13, 2022.

(51) Int. Cl.
*H04N 21/2668* (2011.01)
*H04N 21/258* (2011.01)
*H04N 21/81* (2011.01)

(52) U.S. Cl.
CPC ... *H04N 21/2668* (2013.01); *H04N 21/25891* (2013.01); *H04N 21/812* (2013.01)

(58) Field of Classification Search
CPC ......... H04N 21/2668; H04N 21/25891; H04N 21/812
See application file for complete search history.

(56) References Cited

U.S. PATENT DOCUMENTS

| | | | | |
|---|---|---|---|---|
| 8,869,208 | B2* | 10/2014 | Glowaty | H04N 21/4828 725/53 |
| 9,473,819 | B1* | 10/2016 | Bostick | H04N 21/4722 |
| 9,992,523 | B1* | 6/2018 | Chen | H04N 21/251 |
| 11,265,624 | B2* | 3/2022 | Zhou | H04N 21/6582 |
| 2005/0144499 | A1* | 6/2005 | Narahara | H04N 21/44224 348/E7.071 |
| 2006/0280106 | A1* | 12/2006 | 'T Hooft | G11B 7/14 |

(Continued)

FOREIGN PATENT DOCUMENTS

| | | |
|---|---|---|
| CN | 107784066 A | 3/2018 |
| CN | 112765464 A | 5/2021 |

OTHER PUBLICATIONS

Nov. 30, 2022—International Search Report—PCT/CN2022/086585.

(Continued)

*Primary Examiner* — Timothy R Newlin
(74) *Attorney, Agent, or Firm* — Banner & Witcoff, Ltd.

(57) ABSTRACT

Methods are described for managing transmission resources using user group correlation. A content provider or an advertiser may send, to a network provider, a content item that is to be transmitted to a target audience. The content provider or the advertiser may indicate the target audience by providing data identifying one or more criteria for the target audience. The network provider may use the data from the content provider to determine an initial user group that matches the criteria, and one or more additional user groups that are similar to the initial user group within a threshold. The network provider may transmit the content item to the initial user group and to the additional user groups.

21 Claims, 13 Drawing Sheets

Live Content User Group 404

Online Streaming User Group 405

Video On Demand User Group 406

Have any users in live content user group 404 expressed an interest in:

| | |
|---|---|
| Football | 1 –Yes |
| Basket Weaving | 1 – Yes |
| Pop Music | 1 – Yes |
| Travelling | 0 – No |
| Puppetry | 1 – Yes |
| Rock Skipping | 0 – No |

(56) References Cited

U.S. PATENT DOCUMENTS

| | | | | |
|---|---|---|---|---|
| 2007/0136756 | A1* | 6/2007 | Ishida | H04N 21/2668 725/35 |
| 2007/0219985 | A1* | 9/2007 | Aravamudan | G06F 16/2453 707/999.005 |
| 2009/0158307 | A1* | 6/2009 | Kashitani | H04H 60/46 725/32 |
| 2010/0070454 | A1* | 3/2010 | Masuda | H04N 21/25891 707/E17.014 |
| 2010/0251305 | A1* | 9/2010 | Kimble | H04N 7/17318 725/46 |
| 2011/0173662 | A1* | 7/2011 | Beppu | H04N 21/4668 725/46 |
| 2014/0052656 | A1* | 2/2014 | Ball | G06Q 10/1053 705/319 |
| 2014/0365507 | A1* | 12/2014 | Wissner | G06F 16/972 707/748 |
| 2016/0055159 | A1* | 2/2016 | Connolly | G06F 16/285 707/734 |
| 2016/0127775 | A1* | 5/2016 | Zilberstein | H04N 21/458 725/34 |
| 2016/0142775 | A1* | 5/2016 | Kim | H04N 21/84 725/14 |
| 2016/0191447 | A1* | 6/2016 | Firat | G06Q 50/01 709/204 |
| 2017/0289595 | A1* | 10/2017 | Lewis | H04N 21/4826 |
| 2018/0213284 | A1* | 7/2018 | Shekhar | H04N 21/4532 |
| 2020/0167386 | A1* | 5/2020 | Venkataraman | H04N 21/4668 |
| 2020/0311159 | A1* | 10/2020 | Ahlstrom | G06F 16/285 |
| 2021/0026901 | A1* | 1/2021 | Aher | G06F 16/90328 |
| 2022/0309937 | A1* | 9/2022 | Yoshihara | G09B 5/06 |

OTHER PUBLICATIONS

"6.2 Feature extraction", @ 2007-2022, scikit-learn developers (BSD License).

"tf-idf", Wikipedia, Apr. 7, 2022, 4:25PM. Retrieved from "https://en.wikipedia.org/w/index.php?title=Tf-idf&oldid=1071253989".

* cited by examiner

Initial User Group Profile:

Content Item: music video 408

Interest(s): Pop Music, Female Artists, Upbeat Tempos

Transmission: Live Content

Similarity Threshold: 0.8

FIG. 5

|  | Football | Basket Weaving | Pop Music | Traveling | Puppetry | Rock Skipping |
|---|---|---|---|---|---|---|
| Live Content User Group 404 | 901<br>1 | 902<br>1 | 903<br>1 | 904<br>0 | 905<br>1 | 906<br>0 |
| Online Streaming User Group 405 | 907<br>0 | 908<br>1 | 909<br>0 | 910<br>1 | 911<br>1 | 912<br>0 |
| Video On Demand User Group 406 | 913<br>1 | 914<br>1 | 915<br>1 | 916<br>0 | 917<br>0 | 918<br>0 |

FIG. 9A

|  | Football | Basket Weaving | Pop Music | Traveling | Puppetry | Rock Skipping |
|---|---|---|---|---|---|---|
| Live Content User Group 404 | 901 (1) | 902 (1) | 903 (1) | 904 0 | 905 (1) | 906 0 |
| Online Streaming User Group 405 | 907 0 | 908 1 | 909 0 | 910 1 | 911 1 | 912 0 |
| Video On Demand User Group 406 | 913 1 | 914 1 | 915 1 | 916 0 | 917 0 | 918 0 |

FIG. 9B

|  | Football | Basket Weaving | Pop Music | Traveling | Puppetry | Rock Skipping |
|---|---|---|---|---|---|---|
| Live Content User Group 404 | 901<br>1 | 902<br>1 | 903<br>1 | 904<br>0 | 905<br>1 | 906<br>0 |
| Online Streaming User Group 405 | 907<br>0 | 908<br>1 | 909<br>0 | 910<br>1 | 911<br>1 | 912<br>0 |
| Video On Demand User Group 406 | 913<br>1 | 914<br>1 | 915<br>1 | 916<br>0 | 917<br>0 | 918<br>0 |

Live Content User Group 404 — Football 901

$$\frac{(1)}{1+1+1+0+1+0} * \log_{10}\frac{(3)}{(2)}$$

FIG. 11

| | Football | Basket Weaving | Pop Music | Traveling | Puppetry | Rock Skipping |
|---|---|---|---|---|---|---|
| Live Content User Group 404 | 901 $\frac{1}{4} * \log_{10}\frac{3}{2}$ | 902 0 | 903 $\frac{1}{4} * \log_{10}\frac{3}{2}$ | 904 0 | 905 $\frac{1}{4} * \log_{10}\frac{3}{2}$ | 906 0 |
| Online Streaming User Group 405 | 907 0 | 908 0 | 909 0 | 910 $\frac{1}{3} * \log_{10}\frac{3}{1}$ | 911 $\frac{1}{3} * \log_{10}\frac{3}{2}$ | 912 0 |
| Video On Demand User Group 406 | 913 $\frac{1}{3} * \log_{10}\frac{3}{2}$ | 914 0 | 915 $\frac{1}{3} * \log_{10}\frac{3}{2}$ | 916 0 | 917 0 | 918 0 |

|  | Football | Basket Weaving | Pop Music | Traveling | Puppetry | Rock Skipping |
|---|---|---|---|---|---|---|
| Live Content User Group 404 | 901<br>0.044 | 902<br>0 | 903<br>0.044 | 904<br>0 | 905<br>0.044 | 906<br>0 |
| Online Streaming User Group 405 | 907<br>0 | 908<br>0 | 909<br>0 | 910<br>0.159 | 911<br>0.059 | 912<br>0 |
| Video On Demand User Group 406 | 913<br>0.059 | 914<br>0 | 915<br>0.059 | 916<br>0 | 917<br>0 | 918<br>0 |

FIG. 12

| Abbreviations | User Group Vectors | Similarity Function | Similarity Value |
|---|---|---|---|
| Live Content User Group 404: "LC" | cos ([LC], [OS]) | $\cos([LC], [OS]) = \dfrac{[LC] \cdot [OS]}{\|[LC]\| * \|[OS]\|}$ | 0.557 |
| Online Streaming User Group 405: "OS" | cos ([LC], [VOD]) | $\cos([LC], [VOD]) = \dfrac{[LC] \cdot [VOD]}{\|[LC]\| * \|[VOD]\|}$ | 0.816 |
| Video On Demand User Group 406: "VOD" | cos ([OS], [VOD]) | $\cos([OS], [VOD]) = \dfrac{[OS] \cdot [VOD]}{\|[OS]\| * \|[VOD]\|}$ | 0 |

FIG. 13A

|  | Live Content User Group 404 | Online Streaming User Group 405 |
|---|---|---|
| Football | 1 | 0 |
| Basket Weaving | 1 | 1 |
| Pop Music | 1 | 0 |
| Traveling | 0 | 1 |
| Puppetry | 1 | 1 |
| Rock Skipping | 0 | 0 |

Similarity: 0.557

|  | Live Content User Group 404 | Video on Demand User Group 406 |
|---|---|---|
| Football | 1 | 1 |
| Basket Weaving | 1 | 1 |
| Pop Music | 1 | 1 |
| Traveling | 0 | 0 |
| Puppetry | 1 | 0 |
| Rock Skipping | 0 | 0 |

Similarity: 0.816

|  | Online Streaming User Group 405 | Demand User Group 406 |
|---|---|---|
| Football | 0 | 1 |
| Basket Weaving | 1 | 1 |
| Pop Music | 0 | 1 |
| Traveling | 1 | 0 |
| Puppetry | 1 | 0 |
| Rock Skipping | 0 | 0 |

Similarity: 0

| | |
|---|---|
| ▓ | Unique agreement |
| ░ | Disagreement |
| □ | Uniform agreement |

FIG. 13B

MANAGING TRANSMISSION RESOURCES

CROSS REFERENCE TO RELATED APPLICATIONS

This application claims priority to and is a continuation of PCT/CN22/86585, filed Apr. 13, 2022, the contents of which are hereby incorporated by reference in their entirety.

BACKGROUND

Content owners and advertisers have significant interest in and devote significant resources to transmitting content to users. Content owners and advertisers aim to reach as many different users as possible with their content, and focus future transmissions on targeting new users that have yet to be targeted or have yet to receive content. These and other needs and shortcomings are identified and addressed in the disclosure.

SUMMARY

The following summary presents a simplified summary of certain features. The summary is not an extensive overview and is not intended to identify key or critical elements.

Data transmission resources may be managed based on user group correlation. A network provider may transmit content to users, and may store historical transmission information indicating characteristics of each transmission, such as the transmission media that is used and the type of content that is transmitted. The characteristics of each transmission may be used to determine user groups having similar interests, and may be used to manage content transmissions that are requested at a later time.

A content provider may request that a content item be transmitted by a network provider to a target group of users. The content provider may indicate characteristics of the users who the content provider wishes to target, such as interests in one or more topics (e.g., a music distributor may wish to send a music item to users who have expressed interest in similar types of music). The network provider may use the description from the content provider to generate an initial user group profile that identifies an initial group of users who will receive the content item. The network provider may also use the historical transmission information to identify additional users who might not have exactly matched the content provider's description, but whose interests are determined to be similar enough to be included. The network provider may transmit content items to all or portions of the initial user group and/or to the additional user groups, and this may save transmission and processing resources by potentially avoiding a repeat request from the content provider (e.g., if a transmission to just the initial user group would have been deemed insufficient coverage by the content provider).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows an example initial user group profile.
FIGS. 9A-C show examples of data indicating whether at least one user within a particular user group has expressed an interest in a topic, and how the data may be processed for finding group similarities.
FIG. 10 shows an example determination of a score using a topic importance value and a topic uniqueness value.
FIG. 11 shows example scores associated with each topic within each user group.
FIG. 12 shows example scores in simplified form.
FIG. 13A shows example determinations of user group similarity values using a similarity function.
FIG. 13B shows comparisons, for all possible pairs of the example user groups, of the data indicating the topics in which users within the user groups have expressed interest.

DETAILED DESCRIPTION

The accompanying drawings illustrate examples of various features described herein. Although various details are illustrated, the examples and details are not limiting, and the various features may be rearranged, modified, replaced, and/or supplemented as desired.

Figure 1:
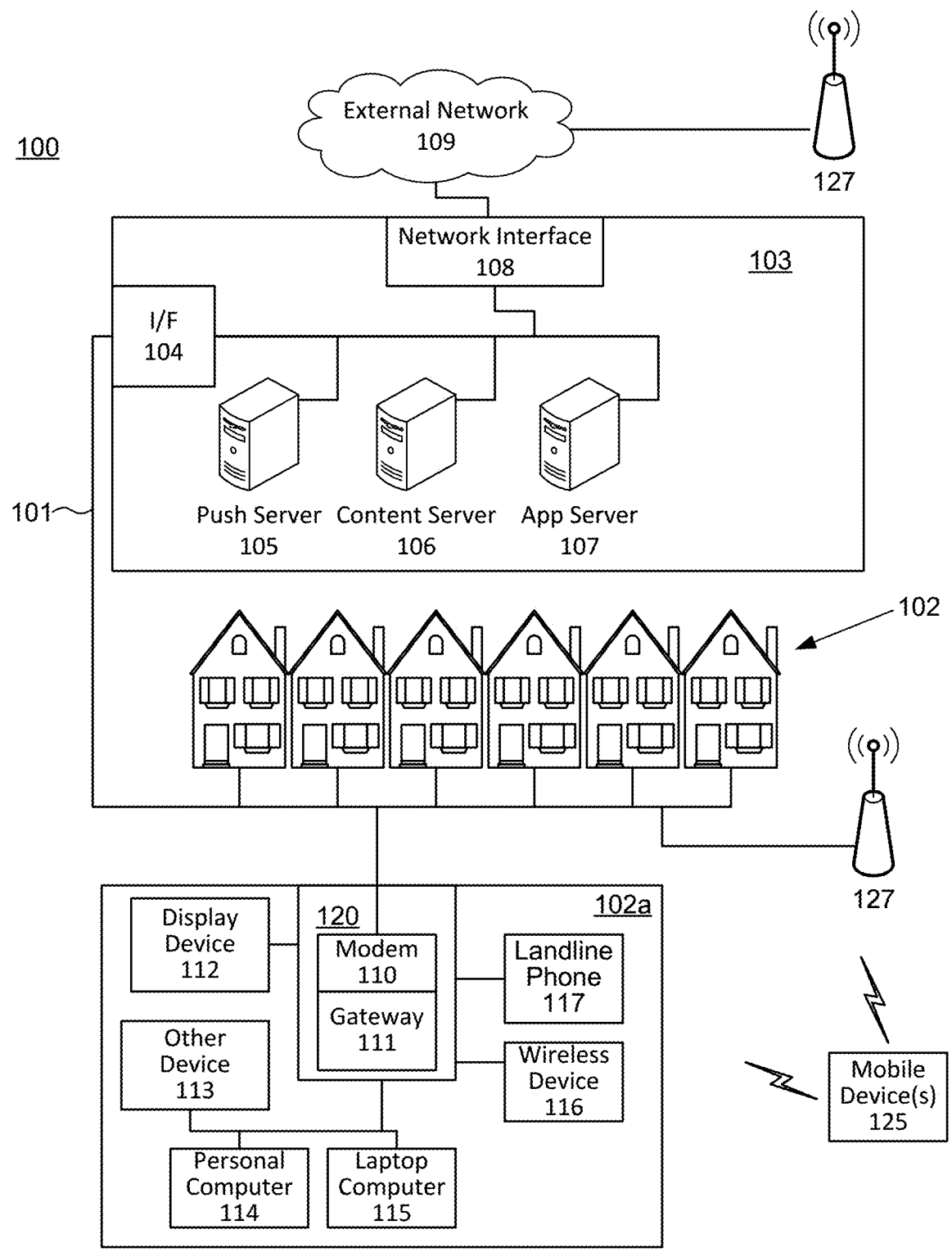
FIG. 1 shows an example communication network.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
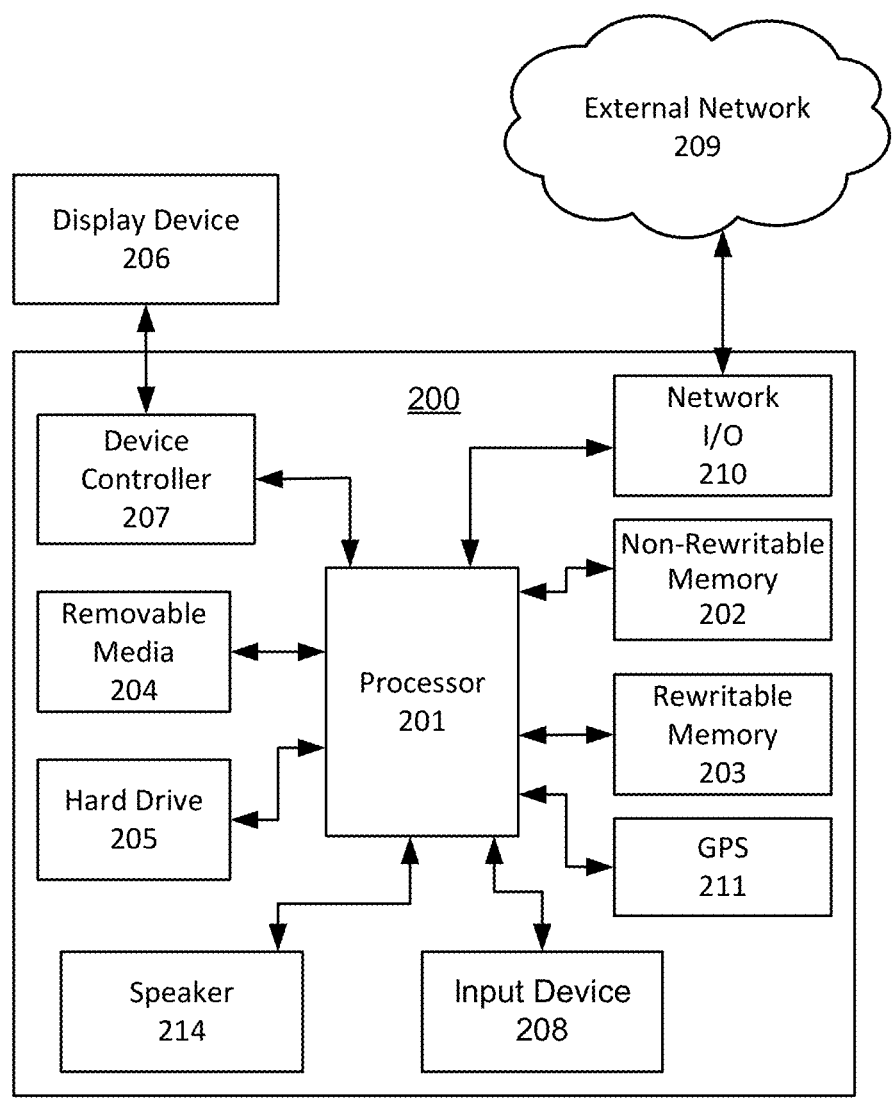
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
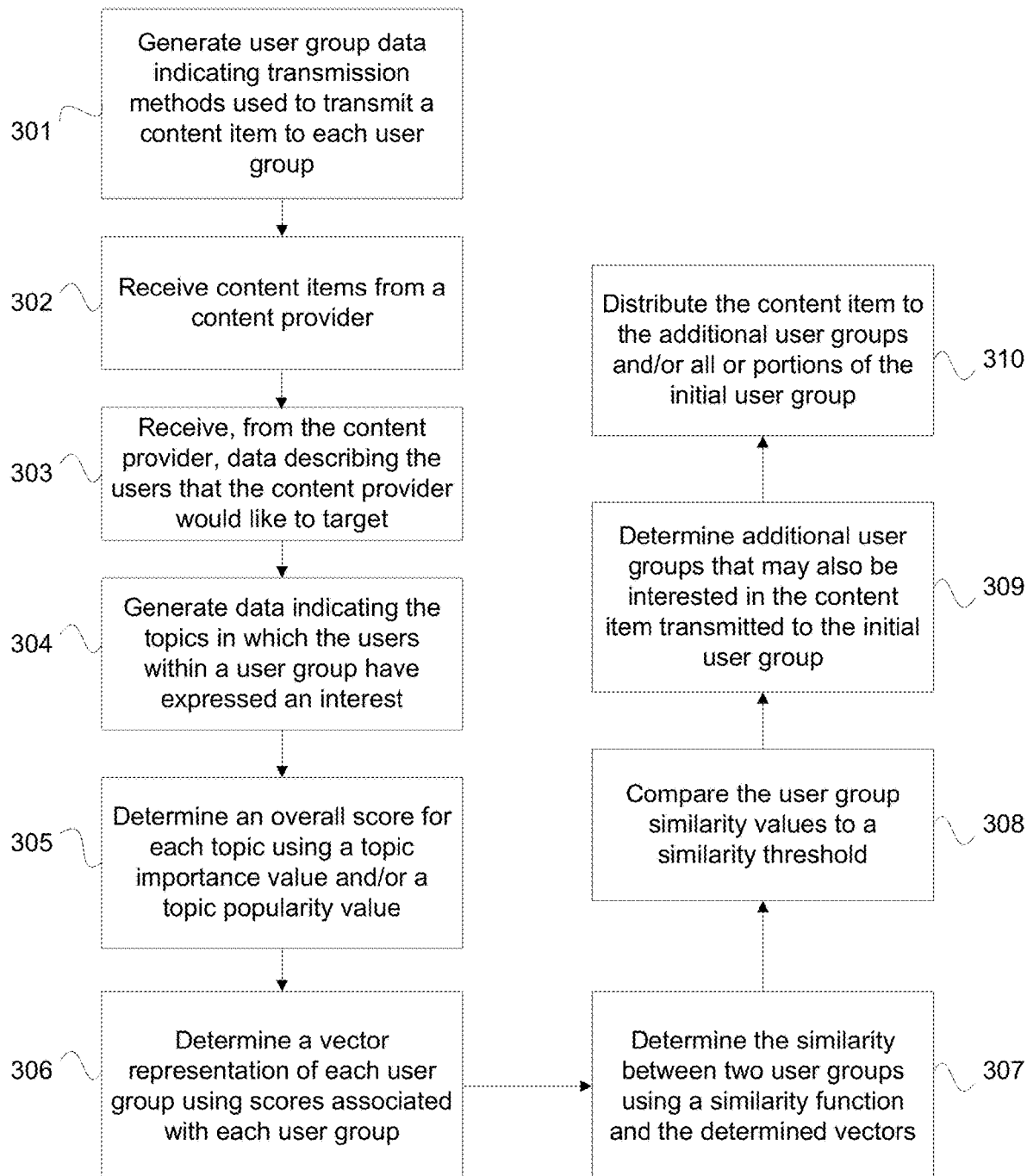
FIG. 3 is a flow diagram showing an example method for data transmission to different user groups.

FIG. 3 shows a flow diagram containing an example method for allocating resources for data transmission to different user groups. A user group may be based on demographic information that may describe each user within the user group. A user group may be based on the transmission method that may be used to reach the users within the user group. For example, viewers of live content (e.g., content that is transmitted according to a schedule, such as broadcast television of live sporting events, nightly news programs, weekly episodes that are broadcast every Sunday night at 9 pm, scheduled multicast, etc.), video on demand content (e.g., content that a user may request through a set-top box or digital video recorder from their video provider, such as pay-per-view movies), and online streaming content (e.g., content that is made available to users via a website, such as PEACOCK, NETFLIX, etc., which a user accesses with a computing device and an associated browser) may be three separate user groups associated with three separate transmission methods (e.g., live content, video on demand, and online streaming). The transmission method may indicate a hardware and/or software medium via which a user within a user group receives content items from a network provider.

A content item may include audio and/or video data that may be delivered to a user for informational purposes, entertainment purposes, or the like (e.g., audio, video, and/or audiovideo content, such as a trailer for a new action film, a music video, details that describe an upcoming football game, details that describe a basket weaving course, etc.). A content provider may work with a network provider to transmit content items to user groups. The content provider may be interested in transmitting a content item to users who may be interested in the content item, and may describe the users who may be interested in the content item. However, the content provider might not know of additional users who may also be interested in the content item, so if the group of users that satisfy the content provider's description is of an unsatisfactory size (e.g., too small), then the content provider may issue a new request with a revised description of the users they would like to target, but this duplicative request (and associated transmission) may increase congestion and waste in network provider resources. The network provider may use the features described herein to identify, based on the content provider's description, an initial user group comprised of users who may be interested in the content item. The network provider may also use the features described herein to identify additional user groups, based on the initial user group, that may also be interested in the content item, and may cause transmission of the content item to the additional user groups as well as the initial group.

Doing so may improve the efficiency with which the network provider distributes content items to users. Identifying additional user groups that may also be interested in the content item may reduce the frequency with which a content provider may issue requests for the network provider to transmit the content item. For example, if a content provider initially indicates that a content item (e.g., an advertisement) is to be sent to users who have expressed an interest in country music, but later realizes that the transmission did not reach a large enough population of users, then the content provider may issue a second request with the content provider attempting to describe a larger audience (e.g., asking to include users who are interested in country music as well as classic rock). The content provider may wish to reach a certain audience volume, and these repeated requests may unduly consume transmission resources of the network provider (who now must make multiple transmissions of the content item due to the content provider's inability to fully identify an audience of suitable size). Features herein may allow the network provider to broaden the audience, and doing so may reduce the frequency with which a content provider requests, and a network provider distributes, a content item across a data transmission network, and may improve the efficiency of the data transmission network. Many content providers may seek to transmit data using the transmission network, and a crowded network may cause undesired delays in data transmission. If data is more intelligently targeted to users (e.g., if an audience of a desired size is more efficiently identified), the targeting may reduce the overall bandwidth being consumed, and as a result, may help alleviate data transmission delays and congestion on a transmission network.

The content provider may provide the network provider with a description of the users to whom the content provider wishes to send a content item. For example, the content provider may wish to send an advertisement for a Lady Gaga music video to users who are interested in pop music, female artists, and music with an upbeat tempo. The content provider may indicate a preferred transmission method (e.g., television broadcasts). The network provider may use this description to select, from a plurality of user groups, an initial user group that matches the content provider's criteria (e.g., matches the content provider's description of the users it would like to target). Additionally or alternatively, the network provider may offer the content provider a list of predefined user groups, and the content provider may select one or more of the groups to be the initial user group for the content item.

The network provider may also determine, using a similarity threshold, additional user groups that may also be interested in the content item, to broaden the reach of the transmission of the content item, and potentially avoid repeat requests from the content provider. This may be accomplished by determining a vector representation of the topics in which users within the initial user group have expressed an interest, and comparing that vector with vector representations of topics in which users within other user groups have expressed an interest, to identify one or more additional user groups whose vectors satisfy the similarity threshold. The similarity threshold may indicate the degree of flexibility between the interests associated with the initial user group and the interests associated with the additional user groups that the content provider may tolerate when sending the content item to both the initial user group and the additional user groups, as discussed below. For example, a similarity threshold value of 1.0 may indicate that the content provider would like the content item to be transmitted only to the users who exactly match the content provider's description. A similarity threshold value less than 1.0 may indicate that the content provider may tolerate differences in the interests associated with the initial user group and the interests associated with the additional user groups.

The content provider may transmit the similarity threshold to the network provider to indicate how strict or expansive the content provider wishes to be when it comes to identifying additional groups that may be interested in the content item that is transmitted to the initial user group. The network provider may provide the content provider with a sliding scale (e.g., a scale of 0.0 to 1.0), and may request that the content provider select a similarity threshold value using the provided scale. Since the content provider might be expected to pay the network provider for the transmission of the content item, and the payment amount may be proportional to the size of the user groups that receive the transmission, the content provider may wish to exert control over the use of additional groups by using this threshold as a way to control costs.

Each step within FIG. 3 may be discussed in parallel with the remaining figures. The processes illustrated in FIG. 3 are merely sample processes and functions. The steps shown may be performed in the order shown, in a different order, with additional steps, or with fewer steps, without departing from the disclosure. One or more steps may be performed simultaneously with other steps shown and described. The processes and functions illustrated in FIG. 3 may be performed by a computing device, such as content server 106.

At step 301, data describing a plurality of user groups may be generated. A network provider may identify a plurality of user groups and may generate data that describes each user group within the plurality of user groups. The network provider may describe a user group based on demographic information that may describe each user within the user group. For example, the network provider may describe each user group based on the transmission method through which users within the user group receive content items. Determining the user groups based on transmission method may result in larger user groups than if the network provider determined the user groups based on specific information that may describe the users within the user group (e.g., location, salary, occupation, etc.). When applied to larger user groups, the methods described herein may identify a greater quantity of users who may also be interested in the content item that the content provider is interested in transmitting.

The content provider may be interested in maximizing the efficiency of each transmission of their content item and in sending their content items to users who are most likely to engage with it. The content provider may have a general idea of the users who may be interested in a content item, but the content provider might not be aware of other users who may also be interested. The content provider may send, to the network provider, a description of the users who may be interested in the content item. By using the user group data that describes the plurality of user groups and the features described herein, the network provider may identify, from the plurality of user groups, an initial user group that satisfies the content provider's description. The network provider may also use the user group data that describes the plurality of user groups and the features described herein to determine one or more additional user groups that may also be interested in the content item that the content provider is interested in transmitting.

Figure 4:
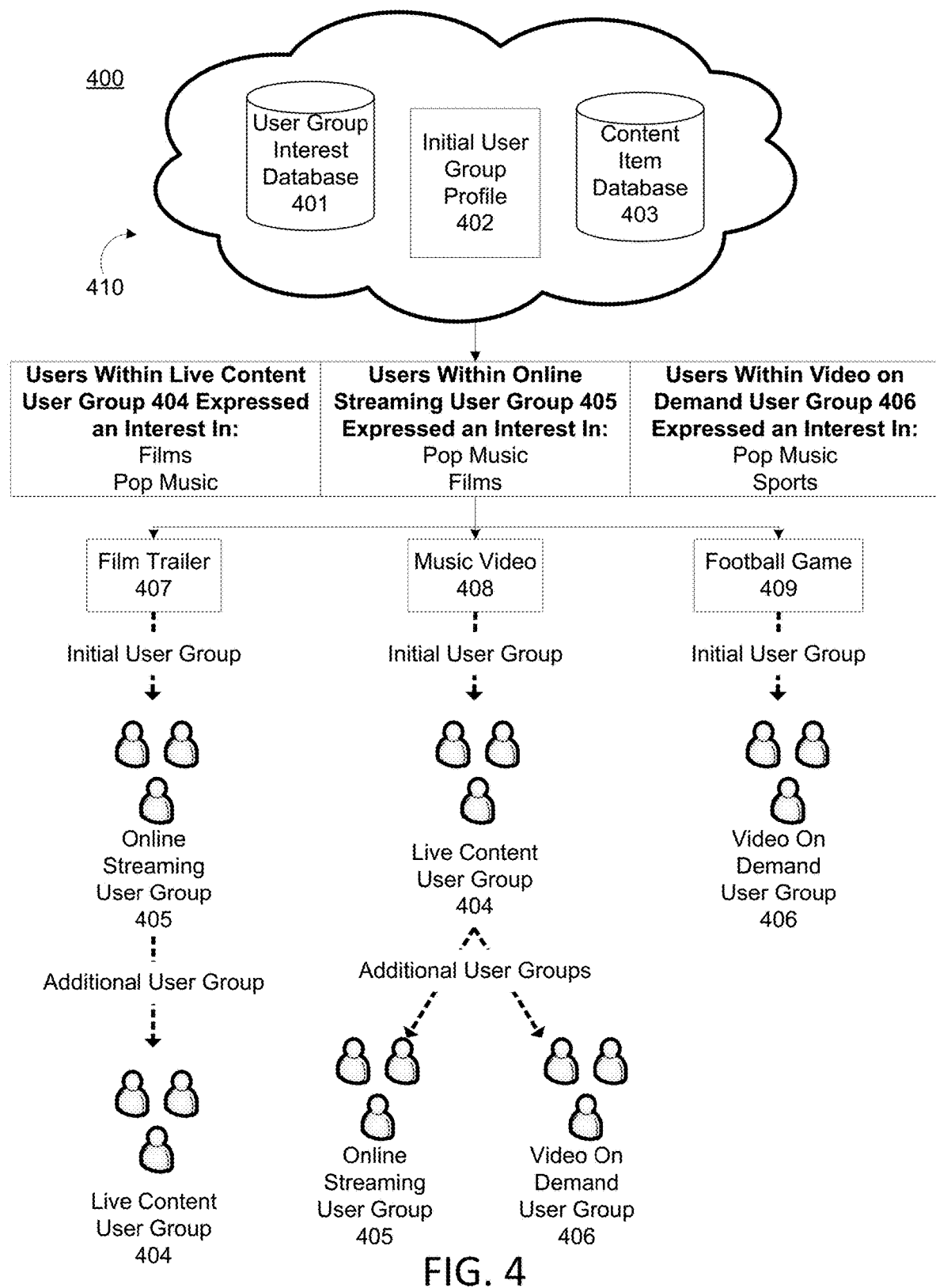
FIG. 4 is a high-level overview of determining the user group(s) that may receive a content item.

FIG. 4 represents a high-level overview of identifying additional user groups that may also be interested in the content item that the content provider is interested in transmitting. As illustrated in FIG. 4, user groups may include live content user group 404, online streaming user group 405, and video on demand user group 406. Users within the live content user group 404 may receive content items from the network provider through television broadcasts, scheduled multicasts, or the like (e.g., live sporting events, weekly episodes that are broadcast every Sunday night at 9 pm, etc.). Users within the online streaming user group 405 may receive content items from a network provider by streaming content items via a computing device that may connect to the Internet (e.g., streaming a movie on NETFLIX using a mobile device that can connect to the Internet). Users within the video on demand user group 406 may receive content items from a network provider by selecting a content item from a database of pre-recorded content items made available by the network provider using a device that may be provided by the network provider (e.g., selecting a movie from a catalog of available movies via a set-top box). While three user groups are shown in FIG. 4, more or less that three user groups may be analyzed to identify additional user groups that may be interested in the content item that the content provider is interested in transmitting. The network provider may use the content provider's description of the users who may be interested in the content item to identify, from the plurality of user groups, an initial user group that matches the content provider's description, as discussed in step 303.

At step 302, a plurality of content items may be received. The network provider may receive, from the content provider, a data file containing a plurality of content items that the content provider may be interested in sending to users. A content item may include audio and/or video data that may be delivered to a user for informational purposes, entertainment purposes, or the like. As illustrated in FIG. 4, a content item may include film trailer 407, music video 408, and football game 409. While three content items are shown in FIG. 4, the content provider may identify more or less than three content items that they may be interested in sending to users.

The content items 407, 408, and 409 may be stored in data repository 410. For example, the content items 407, 408, and 409 may be stored in content item database 403 within data repository 410. Data repository 410 may store groups of data that the network provider may use to identify additional user groups that may also be interested in the content item that the content provider is interested in transmitting. For example, data repository 410 may store the user group interest database 401 (discussed in step 304), the initial user group profile 402 (discussed step 303), and the content item database 403. The network provider may interact with the content item database 403 to locate the particular content item that the content provider wishes to transmit.

For example, as illustrated in FIG. 4, the content provider may be interested in sending, to an initial target group and to additional user groups that may also be interested, the film trailer 407, music video 408, and football game 409. For each one of the film trailer 407, music video 408, and football game 409, the content provider may describe the users who may be interested in the content item, as discussed in step 303. The network provider may use the description of the users who may be interested in the content item to identify, from a plurality of user groups, an initial user group. For example, based on the description from the content provider, the network provider may identify the online streaming user group 405 as the initial user group that receives the film trailer 407, the live content user group 404 as the initial user group that receives the music video 408, and the video on demand user group 406 as the initial user group that receives the football game 409. Using the features described in steps 305 to 309, the network provider may determine additional user groups that may also be interested in each one of the film trailer 407, music video 408, and football game 409.

The network provider may determine that there might not be an additional user group that satisfies the criteria determined by the content provider. For example, the network provider may determine that there might not be an additional user group that may also receive the football game 409. The network provider may determine that there may be at least one additional user group that satisfies the criteria determined by the content provider. The network provider may distribute the content item to the at least one additional user group and/or all or portions of the initial user group. For example, the network provider may determine that both the online streaming user group 405 and the video on demand user group 406 satisfy the criteria determined by the content provider, and may send the music video 408 to all or portions of the initial user group (e.g., live content user group 404) and/or to the additional user groups that may also be interested in the music video 408 (e.g., online streaming user group 405 and video on demand user group 406).

At step 303, data describing the users who may be interested in a content item may be received. The network provider may receive, from the content provider, a description of the users who the content provider wishes to target (e.g., users who receive content items via televisions broadcasts). The content provider may be interested in transmitting the content item to users who may be responsive to the content item. For example, the content provider may indicate that they are interested in sending the music video 408 to users who receive content items via television broadcasts. To identify an initial user group, the network provider may select, from the plurality of user groups, a user group that most closely matches the content provider's criteria. The content provider's criteria may be used to generate an initial user group profile (e.g. initial user group profile 402). FIG. 5 depicts an example of an initial user group profile.

As illustrated in FIG. 5, the initial user group profile 402 may indicate the content item that the content provider is interested in transmitting. The plurality of content items received in step 302, by the network provider and from the content provider, may include the content item that the content provider is interested in transmitting. As illustrated in FIG. 5, the content item that the content provider is interested in transmitting is the music video 408.

The content provider may identify, for each content item within the content item database 403, interests held by the users who may be responsive to the content item selected by the content provider. The content provider may identify the interests by describing the content of the content item (e.g., the content provider may determine that users who may be responsive to an advertisement for a Lady Gaga music video may be interested in music with an upbeat tempo, female artists, pop music, etc.). The content provider may send, to the network provider, a data file indicating the interests as criteria for a target audience. The content provider may also identify a preferred method for transmitting the content item (e.g., television broadcasts). The content provider may use transmission methods to describe the users who they wish to target since doing so may result in a larger group of users than if the content provider described the users who they wish to target based on specific information that describes the users (e.g., location, salary, occupation, etc.).

The interests and the preferred transmission method may be added to the initial user group profile 402, as illustrated in FIG. 5. For example, as illustrated in FIG. 5, the initial user group profile 402 may indicate that the content item selected by the content provider is the music video 408 (e.g., a Lady Gaga music video). The initial user group profile 402 may further indicate that the users who may be responsive to the Lady Gaga music video (e.g., users who may purchase tickets to a Lady Gaga concert, purchase the song in the music video, etc.) may be interested in pop music, female artists, music with an upbeat tempo, or the like. The initial user group profile 402 may also indicate that the content provider is interested in transmitting the Lady Gaga music video to users who receive content items via television broadcasts (e.g., live content user group 404).

The network provider may use the interests identified by the content provider to determine, in addition to all or portions of the initial user group, additional user groups that may also be interested in the content item, as discussed in steps 305 to 309. The network provider may use the data on the initial user group profile 402 to identify, from the plurality of user groups, the initial user group whose characteristics match the data on the initial user group profile 402. For example, the network provider may determine that the initial user group, described by the initial user group profile 402, contains users within the live content user group 404 who may receive the music video 408 from the content provider and who may be interested in pop music, female artists, and/or music with an upbeat tempo. The network provider may also use the data on the initial user group profile 402 to establish the criteria for determining additional user groups that may also be interested in the content item.

The initial user group profile 402 may indicate a similarity threshold, determined by the content provider, which the network provider may use to identify additional user groups that may also be interested in the content item. As the network provider analyzes the plurality of user groups to identify additional user groups that may have interests similar to those of the initial user group, the network provider may use the similarity threshold to determine how strict or loose the similarity should be between the interests held by users within the initial user group and the interests held by users within the additional user groups. For example, if the content provider would like to target users who are interested in pop music, the network provider may identify, from the plurality of user groups, additional user groups with interests that are more or less similar. An interest in rock and roll music from the 1980's may be more similar to pop music than an interest in classical music. As will be explained below, the network provider may determine a degree of similarity for both 1980's rock and roll music and classical music. The network provider may use the similarity threshold to determine whether either one of 1980's rock and roll music or classical music is close enough to pop music to be considered similar for purposes of identifying additional user groups that are related to the initial user group.

A strict similarity threshold (e.g., a similarity threshold value of 1.0) may indicate that the content provider may prefer that the interests of users within the initial user group be identical to the interests of users within the additional user groups. A loose similarity threshold (e.g., a similarity threshold value that is less than 1.0) may indicate that the interests of users within the initial user group may be different from the interests of users within the additional user groups. For example, where the content provider elected a strict similarity threshold for determining additional user groups that may receive the Lady Gaga music video, the network provider may determine that users within the additional user groups should be interested in pop music. Where the content provider elected a loose similarity threshold for determining additional user groups that may receive the Lady Gaga music video, the network provider may determine that an interest in 1980's rock and roll music is sufficiently similar to an interest in pop music. As such, the network provider may determine that users with an interest in 1980's rock and roll music may receive the Lady Gaga music video.

The network provider may measure the similarity between two user groups at a time using a similarity function (e.g., a cosine similarity function), as discussed in step 307. The network provider may produce user group similarity data, which may indicate a similarity value for each pairing of user groups. The network provider may compare each similarity value to the similarity threshold on the initial user group profile 402 to determine additional user groups that may also be interested in the content item.

At step 304, data indicating the interests held by the users within a user group may be generated. The network provider may determine a plurality of interests held by a plurality of users. The content provider may be interested in sending a content item to a user based on the user's interests (e.g., sending the Lady Gaga music video to users interested in female artists). The network provider may send a content item to the users who have expressed an interest in the information within the content item since users who are interested in the content item may be more responsive to the content item (e.g., sending the Lady Gaga music video to users who have previously purchased music by Lady Gaga and/or tickets to Lady Gaga concerts). Alternatively, the network provider might not send a content item to users who have not expressed an interest in the information within the content item since uninterested users may be unresponsive to the content item (e.g., sending the Lady Gaga music video to users who have not purchased music by Lady Gaga or tickets to a Lady Gaga concert).

The network provider may maintain a list of topics and information indicating an interest or lack of interest of one or more users, within each user group, in the topic (e.g., a number or proportion of users in each user group that have expressed interest in a topic, or a binary indication that at least one user in a user group has expressed interest in the topic or that no users in the user group has expressed interest in the topic). The list of topics may be based on an standardized classification system, such as an industry taxonomy or classification (e.g., according to an industry standard, such as the North American Industry Classification System) or a content or genre taxonomy (e.g., a content taxonomy or product taxonomy, such as maintained by the Interactive Advertising Bureau). Also, or alternatively, the network provider may generate a list of topics (e.g., based on topics found to be useful in differentiating or comparing user groups and/or topics for which the network provider has or may collect data indicating interest of one or more users of a plurality of user groups of interest). The list of topics may be invariant over a time scale of interest, such as over a time scale of determining an audience for distribution of a content item, as discussed herein. The network provider may identify the topics in which the users within each user group, of the plurality of user groups, have expressed an interest. The network provider may use numerical representations (e.g., binary values) to indicate whether at least one user within a user group has expressed an interest in a topic. A binary "1" may indicate that at least one user within a user group expressed an interest in a particular topic. A binary "0" may indicate that none of the users within a user group expressed an interest in a particular topic.

A user may express an interest in a topic by responding to a content item that contains information associated with the topic. For example, a user may express an interest in pop music by tuning into a television broadcast of a pop music concert, recording a television broadcast of a pop music concert, browsing program listings for different pop music performances, indicating pop music as a category of interest on a user survey, interacting with an advertisement for a pop music product (e.g., selecting the advertisement, electing to view or not to skip the advertisement before viewing primary content, etc.) subscribing to a pop music channel, or the like. The network provider may monitor such responses. The network provider may use the responses to determine whether at least one user within a user group expressed an interest in the topic displayed in the content item. For example, if the network provider transmits a television broadcast of a Lady Gaga concert to the live content user group 404, the network provider may monitor whether users within the live content user group 404 watch the Lady Gaga concert. If at least one user within the live content user group 404 watches the Lady Gaga concert, the network provider may determine that at least one user within the live content user group 404 is interested in pop music.

Figure 6:
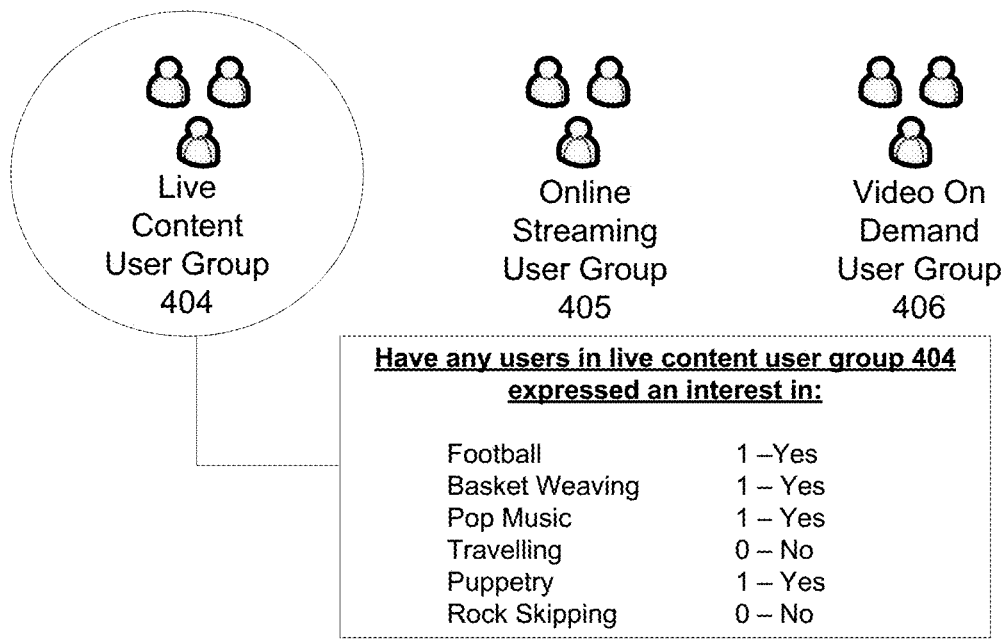
FIGS. 6-8 show example data indicating the topics in which users within a user group have expressed an interest.
Figure 7:
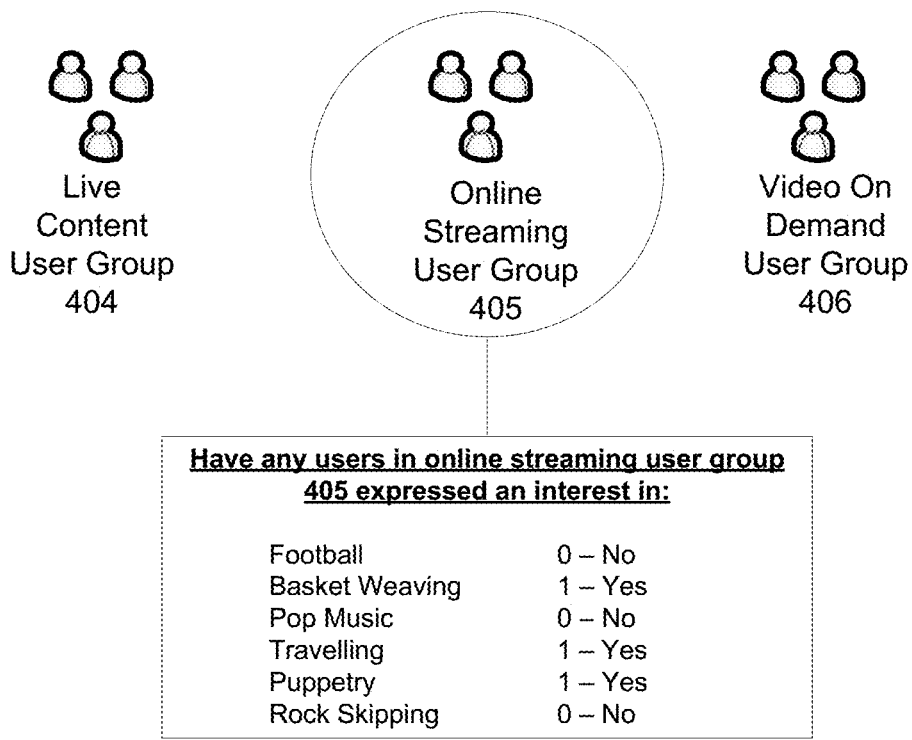
Figure 8:
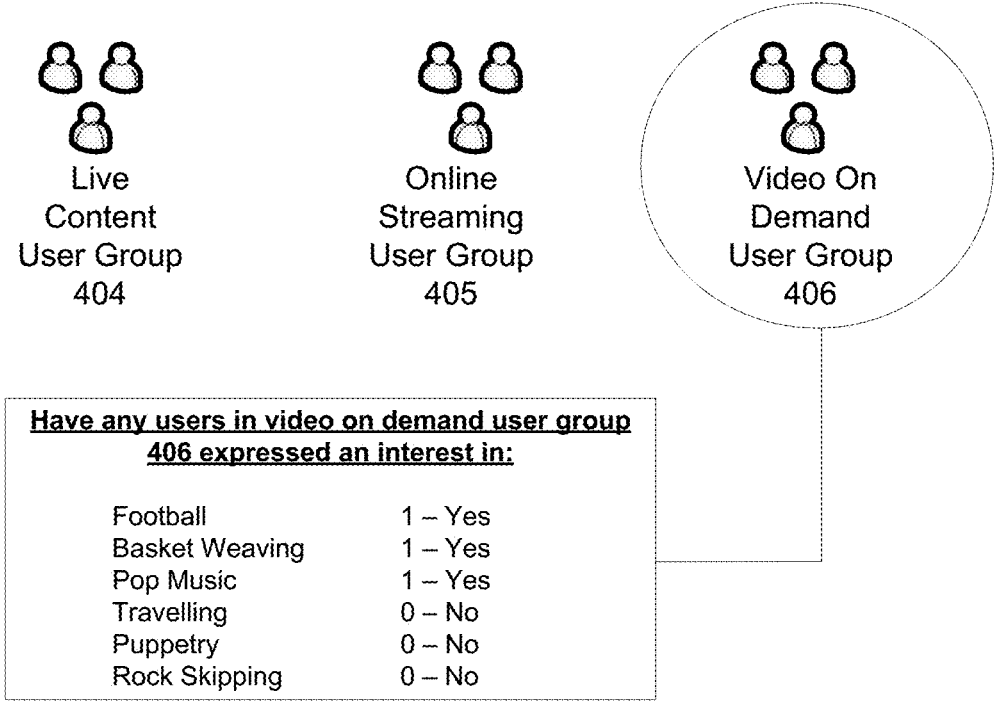

The network provider may continuously update the data that indicates the topics in which the users within a user group have expressed an interest. FIGS. 6-8 illustrate example data that identifies the topics in which the users within a user group have expressed an interest.

FIG. 6 illustrates example data indicating the topics in which the users within the live content user group 404 have expressed an interest. As illustrated in FIG. 6, the binary values indicate that at least one user expressed an interest in football, at least on user expressed an interest in basket weaving, at least one user expressed an interest in pop music, and at least one user expressed an interest in puppetry. The binary values further indicate that none of the users within the live content user group 404 expressed an interest in travelling or rock skipping.

FIG. 7 illustrates example data indicating the topics in which the users within the online streaming user group 405 have expressed an interest. As illustrated in FIG. 7, the binary values indicate that at least one user expressed an interest in basket weaving, at least one user expressed an interest in travelling, and at least one user expressed an interest in puppetry. The binary values further indicate that none of the users within the online streaming user group 405 expressed an interest in football, pop music, or rock skipping.

FIG. 8 illustrates example data indicating the topics in which the users within the video on demand user group 406 have expressed an interest. As illustrated in FIG. 8, the binary values indicate that at least one user expressed an interest in football, at least one user expressed an interest in basket weaving, and at least one user expressed an interest in pop music. The binary values further indicate that none of the users within the video on demand user group 406 expressed an interest in travelling, puppetry, or rock skipping.

The data indicating the topics in which the users within a user group have expressed an interest may be stored in the user group interest database 401 within the data repository 410. The data repository 410 may also store topics in which no users have expressed an interest (e.g., new topics for which interest data is still sparse or has not yet been collected, topics relevant to one or more content providers or to one or more content items to be distributed, topics anticipated to be of interest in the future based on current events, new products, new released content, etc.). As discussed in step 302, the data repository 410 may store groups of data that the network provider may use to identify additional user groups that may also be interested in the content item that the content provider wishes to transmit. For example, the data repository 410 may store the user group interest database 401, the initial user group profile 402, and the content item database 403. The network provider may interact with the user group interest database 401 to retrieve the data indicating the topics in which the users within a user group have expressed an interest. The network provider may determine, for each topic, a value indicating the importance of the topic within each user group (e.g., a topic importance value) and a value indicating the uniqueness of interest in the topic across a plurality of user groups (e.g., a topic uniqueness value), discussed in step 305. The network provider may use the topic importance value and/or the topic uniqueness value associated with each topic to determine a similarity value for each pairing of user groups, as discussed in step 307. The network provider may compare the similarity values to the similarity threshold indicated on the initial user group profile 402, and, based on the comparison, may identify additional user groups that may also be interested in the content item that the content provider wishes to transmit.

At step 305, the network provider may determine a topic importance value and a topic uniqueness value for each topic in which users within a user group have expressed an interest. To determine a topic importance value and a topic uniqueness value, the network provider may use the binary values associated with each topic, as illustrated in FIGS. 6-8. The network provider may generate a data structure which identifies a plurality of user groups and a plurality of topics in which the users within each user group may have expressed an interest. For each combination of a user group and a topic, a binary value may indicate whether at least one user within the user group expressed an interest in the topic. The table in FIG. 9A illustrates an example data structure that uses binary values to indicate whether at least one user within the plurality of user groups (e.g., the live content user group 404, the online streaming user group 405, and the video on demand user group 406) expressed an interest in a particular topic (e.g., football, basket weaving, pop music, traveling, puppetry, or rock skipping). For example, as illustrated in FIG. 9A, at least one user within the live content user group 404 expressed an interest in football while none of the users within the online streaming user group 405 or the video on demand user group 406 expressed an interest in rock skipping. These binary values may be used to determine a topic importance value and a topic uniqueness value for each topic.

A topic importance value may indicate the relative importance of a particular topic as compared to all of the topics in which users within a user group have expressed an interest. The topic importance value of a topic for a user group may be zero in a case that no users in the user group have expressed interested in the topic (e.g., according to the data indicating user interest for users in the user group). In a case that at least one user has expressed interest in the topic, the topic importance value of the topic for the user group may decrease with an increase in number of other topics in which at least one user of the user group has expressed interest. For example, the topic importance value of the topic for the user group may be inversely proportional to a total number of topics in which at least one user of the user group has expressed interest. The topic importance value may be based on a binary value indicating the presence or absence of user interest in the topic and a summation of the binary values associated with the user group. The topic importance value may be a ratio, as expressed in the equation below. Also, or alternatively, the topic importance value may be based on the ratio (e.g., the below ratio to a power, a logarithm of the below ratio, the below ratio multiplied by a constant, etc.). Also, or alternatively, the topic importance value may be based on a number or proportion of users of a user group that have expressed interest in a topic (e.g., relative to a number or proportion of users of the user group that have expressed interest in other topics, or relative to a number or proportion of all users or users in other user groups that have expressed interest in other topics, etc.). The highest topic importance value may be a value of 1, which indicates that the topic is the only topic in which the user group is interested. The topic importance value for a topic in which the user group has expressed interest may decrease with for each additional topic in which the user group has expressed interest. The lowest topic importance value may be a value of 0, which indicates that none of the users within the user group are interested in the topic.

The network provider may determine a topic importance value for each combination of a user group and a topic (e.g., cells 901-918 in FIG. 9A). FIG. 9B illustrates the example binary values that may be used to determine a topic importance value. To determine the topic importance value, the binary value in each cell of FIG. 9B may be treated as a number, and the topic importance value for any particular cell may be determined as a ratio indicating how important a particular topic is to the user group:

$$\text{Topic Importance Value}_{(Topic, User\ Group)} = \frac{1 \text{ if any user in the group is interested in the topic; 0 otherwise}}{\text{Total Number of Topics the Group is Interested in}}$$

In the FIG. 9B example, the live content user group 404 has two topics of interest: football and pop music. Accordingly, football and pop music each represent one-half of the total topics of interest for the live content user group 404, and the topic importance value may indicate this relative importance. The numerator of the topic importance value may be a binary "1" if at least one user within the user group has expressed an interest in the topic or a binary "0" if none of the users within the user group expressed an interest in the topic. The denominator of the topic importance value may be a summation of the binary values associated with the topics within a user group. In the FIG. 9B example, the numerator of the topic importance value is 1 for both football and pop music since at least one user within the live content user group 404 has expressed an interest in football and at least one user within the live content user group 404 has expressed an interest in pop music, indicated by the dashed ovals. The denominator of the topic importance value is 4, indicated by the solid-lined oval. Accordingly, the topic importance value for football within the live content user group 404 may be calculated using the following ratio:

$$\text{Topic Importance Value}_{(Football, Live\ Content\ User\ Group\ 404)} = \frac{1}{1+1+1+0+1+0} = \frac{1}{4}$$

The same is true for basket weaving, pop music, and puppetry. The traveling and rock skipping may each have topic importance values of zero, since the users within the live content user group 404 have not expressed an interest in any one of basket weaving, travelling, or puppetry. However, note that if none of the users within the plurality of user groups have expressed an interest in a topic (e.g., as is the case for rock skipping), then the network provider may ignore the topic importance value determination and the topic uniqueness value determination for the topic while determining topic scores for user groups and determining similarities, as in steps 305-307, as discussed below.

While the topic importance value indicates the importance of a particular topic to a particular group, the topic uniqueness value may indicate the uniqueness of interest in a topic across a plurality of user groups. The topic uniqueness value may be highest for a topic if that topic happens to be of interest to only one user group of the plurality of user groups, and may be lowest if the topic happens to be of interest to all user groups of the plurality of user groups. The topic uniqueness value may provide more weight to topics that have more variability in expressed interest across user groups, which makes the topics more useful in differentiating between the user groups. By providing more weight to topics that have more variability in expressed interest across user groups, the topic uniqueness value may emphasize topics that better differentiate between groups in comparisons between the user groups. The network provider may determine a topic uniqueness value for each topic. FIG. 9C illustrates the example values that the network provider may use to determine a topic uniqueness value. The topic uniqueness value may be determined using on an inverse document frequency type equation, treating user groups as "documents" and the topics "terms". In this way, many potential equations may be used to determine the topic uniqueness value, as long as the topic uniqueness value decreases with increasing numbers of groups that have expressed interest in the topic. To determine a topic uniqueness value, the binary value in each cell of FIG. 9C may be treated as a number (e.g., 1 or 0). The topic uniqueness value for each topic may be determined, for example, as a logarithm of a ratio of a total quantity of user groups to a summation of binary values associated with a topic. Accordingly, the topic uniqueness value may be determined using the following equation, or variations thereof:

$$\text{Topic Uniqueness Value}_{(Topic)} = \log_{\delta}\left(\frac{\text{Total quantity of user groups} + \alpha}{\text{Summation of the binary values associated with the topic} + \beta}\right) + \gamma$$

where $\alpha$, $\beta$, $\gamma$, and $\delta$ may be constants (e.g., selected by the network provider). $\delta$ may be selected to be 10, or another base number selected to increase or decrease an influence of the topic uniqueness value of a topic on the score for a combination of a user group and a topic. $\gamma$ may be a constant selected to be greater than or equal to zero. $\gamma$ may be selected to be greater than zero to increase an influence of the topic importance value on a score for a combination of a user group and a topic. $\beta$ may be selected to be greater than zero to avoid a case of dividing by zero if a summation of the binary values associated with the topic is zero (e.g., if no groups indicate interest in a topic, as is the case with "rock skipping" in FIGS. 6-8 and 9A-C). $\alpha$ and $\beta$ may be selected to be equal to each other, or $\alpha$ may be selected to be equal to 0, particularly in a case that the total quantity of user groups is much greater (e.g., 10-fold, 100-fold, etc.) than the summation of the binary values associated with the topic or the summation of the binary values associated with the topic are much greater than $\beta$ (e.g., 10-fold, 100-fold, etc.). In a case of a large number of users in each user group, the summation of the binary values associated with a topic is unlikely to be zero, and $\beta$ may be selected to be zero. Also, or alternatively, topics may be selected or identified based on receiving information indicating interest in the topic by a user in a user group, thereby guaranteeing that the summation of the binary values associated with the topic is not zero, and $\beta$ may be selected to be zero. Also, or alternatively, $\beta$ may be selected to be zero, and in a case that no groups indicate an interest in a topic, the topic uniqueness value of a topic may be set to zero. In other words, the topic uniqueness value of a topic may be determined using the following equation.

$$\text{Topic Uniqueness Value}_{(Topic)} = \begin{cases} \log_{10}\left(\frac{\text{Total quantity of user groups}}{\text{Summation of the binary values associated with the topic}}\right), & \text{Summation of the binary values associated with the topic} \neq 0 \\ 0, & \text{Summation of the binary values associated with the topic} = 0 \end{cases}$$

Also, or alternatively, the topic uniqueness value may be calculated as a different function of a ratio of the total quantity of user groups to a summation of binary values associated with a topic, or of a ratio of a total quantity or proportion of users of a user group that have indicated an interest in the topic to a total quantity or proportion of users of the plurality of user groups or of the other user groups that have of indicated interest in a topic. For example, the topic uniqueness value may be calculated as the ratio or a power of the ratio of the total quantity of user groups to a summation of binary values associated with a topic, or of a ratio of a total quantity or proportion of users of a user group that have indicated an interest in the topic to a total quantity or proportion of users of the plurality of user groups or of the other user groups that have of indicated interest in a topic.

A topic uniqueness value may be calculated for each topic to indicate the uniqueness of interest in the topic across a plurality of user groups. As illustrated in FIG. 9C, there are three user groups: the live content user group 404, the online streaming user group 405, and the video on demand user group 406. Of the three user groups, only one user group contains at least one user who has expressed an interest in football (e.g., the live content user group 404). The numerator of the topic uniqueness value may be the total quantity of user groups, indicated by the dotted oval. The denominator of the topic uniqueness value may be the summation of the binary values associated with football, indicated by the dotted-dashed oval. In the FIG. 9C example, the numerator is 3 and the denominator is 2. Accordingly, the topic uniqueness value for football may be determined using a logarithm of the following ratio:

$$\text{Topic Uniqueness Value}_{(Football)} = \log_{10}\left(\frac{3}{2}\right)$$

The network provider may use the topic importance values and/or the topic uniqueness values to generate a score for each cell in the table in FIG. 9A. The network provider may use the scores to determine additional user groups that may also be interested in the content item that the content provider wishes to transmit.

In some instances, the score for each combination of a user group and a topic may be based on topic importance values and/or topic uniqueness values. In some instances, the score for a combination of a user group and a topic may correspond to the topic uniqueness value when the topic importance value is 0 (not illustrated in the figures). In some instances, the score for each combination of a user group and a topic may be the product of the topic importance value and the topic uniqueness value. For example, the score may be determined using the following algorithm:

$$\text{Score}_{(Topic, User\ Group)} = \text{Topic Importance Value}_{(Topic, User\ Group)} * \text{Topic Uniqueness Value}_{(Topic)}$$

FIG. 10 shows an example calculation of a score associated with football within the live content user group 404. As illustrated in FIG. 10, the first factor of the score may represent the topic importance value of football within the live content user group 404. The numerator of the topic importance value may represent a binary indication that there is at least one user within the live content user group 404 who is interested in football, as indicated by the dashed oval. The denominator of the topic importance value may represent the summation of the binary values associated with the topics within the live content user group 404, as indicated by the solid-lined oval. The second factor of the score may represent the topic uniqueness value of football. The numerator of the topic uniqueness value may represent the total quantity of user groups, indicated by the dotted oval. The denominator of the topic uniqueness value may represent the summation of the binary values associated with football, indicated by the dotted-dashed oval. Accordingly, the score associated with football with the live content user group 404 may be determined using the following algorithm:

$$\text{Score}_{(Football, Live\ Content\ User\ Group\ 404)} = \left(\frac{1}{1+1+1+0+1+0}\right) * \left(\log_{10}\frac{3}{2}\right)$$

The table in FIG. 11 shows the score for each combination of a topic and a user group. The table in FIG. 12 shows the score, in simplified form, for each combination of a topic and a user group. The network provider may use the scores associated with each user group to generate a vector representation of each user group, as described in step 306.

At step 306, the score that is associated with each combination of a topic and a user group may be used to generate a vector representation of the user group. For example, as shown in FIG. 12, a vector representation of the live content user group 404 may be generated as [0.044, 0, 0.044, 0, 0.044, 0], a vector representation of the online streaming user group 405 may be generated as [0, 0, 0, 0.159, 0.059, 0], and a vector representation of the video on demand user group 406 may be generated as [0.059, 0, 0.059, 0, 0, 0]. The network provider may use the vector representation of each user group to determine the similarity between any two user groups using a similarity function capable of comparing two or more multidimensional objects (e.g., Pearson's correlation, Spearman's correlation, Kendall's Tau, Jaccard similarity, cosine similarity, Euclidean distance, Manhattan distance, etc.). In particular, a similarity function may be used that measures the angle between two vectors (e.g., a cosine similarity function), as discussed in step 307. Depending on the dimensions of the vectors associated with the user groups, the network provider may use the vectors to generate a graphical representation of each user group (e.g., a graphical representation in a two, three, or four-dimensional coordinate system.

Users within each user group may express an interest in a plurality of topics and, as such, each user group is associated with a score for each topic. The scores may be used as coordinates for generating a vector representation of the user group (e.g., in a topic affinity space). Each score associated with a user group may represent a coordinate such that the dimension of each vector is the same for each user group. Depending on the dimensions of each vector, the scores associated with a user group may be plotted in a coordinate system and may be used to generate the vector representation of the user group. As illustrated in FIGS. 6-8, and summarized in FIG. 9A-9C, the network provider may determine whether the users within each user group expressed an interest in six topics. Based on these determinations of interest, and as will be discussed in more detail below, each user group may be associated with six scores corresponding to the six topics and each vector representing each user group is a six-dimensional vector made up of the six scores.

At step 307, a similarity value between pairings of user groups may be determined. The network provider may use the vectors representing the user groups 404-406 to determine similarity values between pairings of the live content user group 404, the online streaming user group 405, and the video on demand user group 406. To determine a similarity value between a pairing of user groups, the network provider may use a similarity function to compare the two vectors (e.g., a correlation function, a distance, etc.). For example, the network provider may use the following cosine similarity function to determine a similarity value between two user groups:

$$\cos([\text{user group}_1, \text{user group}_2]) = \frac{\text{user group}_1 \cdot \text{user group}_2}{\|\text{user group}_1\| \cdot \|\text{user group}_2\|}$$

FIG. 13A shows calculations of similarity values between each pair of vectors representing the user groups 404-406. The network provider may determine the dot product and the magnitudes of the vectors. The network provider may divide the dot product of the vectors by the product of the magnitudes of the vectors to determine the cosine similarity function of the two vectors. As shown in FIG. 12, the vector representing the live content user group 404 is [0.044, 0, 0.044, 0, 0.044, 0], the vector representing the online streaming user group 405 is [0, 0, 0, 0.159, 0.059], and the vector representing the video on demand user group 406 is [0.059, 0, 0.059, 0, 0, 0]. While this example uses six-dimensional vectors, the network provider may use the similarity function to determine similarities of multidimensional vectors of any number of dimensions. The similarity value between the vector representing the live content user group 404 and the online streaming user group 405 may be determined using the following equation:

$$\cos([\text{Live Content, Online Streaming}]) = \frac{[0.044, 0, 0.044, 0, 0.044, 0] \cdot [0, 0, 0, 0.159, 0.059]}{\|[0.044, 0, 0.044, 0, 0.044, 0]\| \cdot \|[0, 0, 0, 0.159, 0.059]\|}$$
$$= 0.557$$

Using the similarity function (e.g., the cosine similarity function described above), the network provider may determine that the similarity value between the vector representing the live content user group 404 and the vector representing the online streaming user group 405 is 0.557. The similarity function may also be used to calculate similarity values between the vector representing the live content user group 404 and the video on demand user group 406 and between the online streaming user group 405 and the video on demand user group 406. As shown in FIG. 13A, the similarity values for each pair of vectors representing the different user groups would be:

Similarity Value$_{[Live\ Content, Online\ streaming]}$=0.557

Similarity Value$_{[Live\ Content, Video\ on\ Demand]}$=0.816

Similarity Value$_{[Online\ Streaming, Video\ on\ Demand]}$=0

The similarity values between two vectors representing two groups may indicate a similarity in topics for which the users within the respective groups may have expressed an interest. Similarity values calculated using a cosine similarity function may range from 0.0 to 1.0. A similarity value that is close to 1.0 may indicate that the topics in which the users within the two group have expressed an interest are similar. A similarity value that is close to 0.0 may indicate that there is little to no overlap between the topics in which the users within the two groups have expressed an interest. In the above example, the similarity value between the live content user group 404 and the online streaming user group 405 is 0.557, which may indicate a moderate level of similarity in expressed interests of users of the two user groups. The similarity value between the live content user group 404 and the video on demand user group 406 is 0.816, indicating a higher level of similarity between interests of the live content user group 404 and the video on demand user group 406 relative to the level of similarity between the live content user group 404 and the online streaming user group 405. The similarity value between the online streaming user group 405 and the video on demand user group 406 is 0, indicating that there is little to no overlap between the interests of the two groups. The only overlap of interest between the two groups is basket weaving, which is uniformly of interest across all three groups and is therefore associated with topic uniqueness values of 0.

FIG. 13B shows comparisons between the indications of interest corresponding to each user group in the examples of FIGS. 6-8. The shaded entries indicate pairs of topic interest values that contributed to the calculated similarity values between groups. Topics in which all three user groups expressed uniform interest or no interest (uniform agreement, unshaded cells) did not contribute to the similarity calculations, due to the topic uniqueness value and the topic importance value, respectively. Topics for which a pair of user groups disagreed (disagreement, light shaded cells) did not contribute to the similarity value between the pair of user groups. Topics for which only a pair of user groups agreed (unique agreement, dark shaded cells) contributed to the similarity value between the pair of user groups.

At step 308, the similarity values that are associated with the vector pairings containing the initial user group may be compared to the similarity threshold on the initial user group profile 402. The network provider may compare the similarity values that are associated with the vector pairings containing the initial user group to the similarity threshold to identify additional user groups that may also be interested in the content item that the content provider wishes to transmit.

For example, the initial user group profile 402, as illustrated in FIG. 5, indicates that the initial user group is the live content user group 404. The network provider may compare the live content user group 404 to the other user groups within the plurality (e.g., the online streaming user group 405 and the video on demand user group 406) using the similarity values determined in step 307. The network provider may identify the similarity values that are associated with a vector pairing containing the initial user group, and may compare each similarity value to the similarity threshold to determine whether the similarity value satisfies the similarity threshold.

As illustrated in FIG. 13A, there are two similarity values that are associated with vector pairings that contain the live content user group 404. The similarity value between the live content user group 404 and the online streaming user group 405 is 0.5576. The similarity value between the live content user group 404 and the video on demand user group 406 is 0.816. The similarity threshold, as indicated by the content provider and as illustrated in FIG. 5, is 0.8. The network provider may compare each similarity value to the threshold to determine whether the similarity value satisfies the threshold. For example, the similarity value between the live content user group 404 and the online streaming user group 405, 0.557, is less than the threshold value 0.8, whereas the similarity value between the live content user group 404 and the video on demand user group 406, 0.816, is equal to or greater than the threshold value of 0.8. Based on the similarity value not satisfying the threshold, the network provider may determine that the online streaming user group 405 is not sufficiently similar to the live content user group 404 to be identified as an additional user group that may also be interested in the content item that the content provider wishes to transmit. Based on the similarity value satisfying the threshold, the network provider may determine that the video on demand user group 406 is sufficiently similar to the live content user group 404 to be identified as an additional user group that may also be interested in the content item that the content provider wishes to transmit. The network provider may identify each user group that satisfies the similarity threshold as an additional user group that may also be interested in the content item that the content provider wishes transmit.

At step 309, the additional user groups that may also be interested in the content item that the content provider wishes to transmit may be presented to the content provider. The network provider may generate a data file which identifies the additional user groups, and may transmit the data file to the content provider. The content provider may review the additional user groups indicated within the data file, and may select the additional user groups to which the network provider should transmit the content item.

At step 310, a content item may be transmitted to the additional user groups and/or all or portions of the initial user group that may be interested in the content item. The network provider may transmit, to all or portions of the initial user group and/or to the additional user groups identified in step 309, the content item that is indicated on the initial user group profile 402.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
    transmitting a plurality of content items to a plurality of user devices associated with a plurality of user groups;
    accessing information indicating:
        the plurality of user groups;
        a plurality of content topics associated with the plurality of content items; and
        for each combination of a user group, of the plurality of user groups, and a content topic, of the plurality of content topics, whether at least one user, of the user group, is interested in the content topic;
    identifying a topic of a new content item;
    selecting a first user group based on determining that the information indicates that at least one user of the first user group has an identified interest corresponding to the topic of the new content item;
    selecting a second user group based on similarities between the second user group and the first user group, wherein the similarities comprise common topics of interest other than the topic of the new content item and are determined based on a similarity between a first interest vector, associated with the first user group, and a second interest vector, associated with the second user group, wherein the first interest vector and the second interest vector each comprise entries for each content topic of the plurality of content topics; and
    transmitting, the new content item to the first user group and the second user group.

2. The method of claim 1, wherein an interest score for a first content topic, of the plurality of content topics, and the first user group is based on the information indicating that at least one user, of the first user group, is interested in the first content topic.

3. The method of claim 1, wherein a first coordinate of an interest first vector associated with the first user group corresponds to a first content topic, of the plurality of content topics, associated with the first user group and is based on:
    a ratio of:
        a binary indication that at least one user associated with the first user group is interested in the first content topic; and
        a sum of binary values associated with the first user group, wherein each of the binary values associated with the first user group indicates whether at least one user of the first user group is interested in a different content topic of the plurality of content topics; and
    a logarithm of a ratio of:
        a quantity of user groups within the plurality of user groups; and
        a sum of binary values associated with the first content topic, wherein each of the binary values associated with the first content topic indicates whether at least one user of a different user group, of the plurality of user groups, is interested in the first content topic.

4. The method of claim 1, wherein coordinates of first vector associated with the first user group correspond to at least two content topics, of the plurality of content topics, that, according to the information, are of interest to at least one user group of the plurality of user groups.

5. The method of claim 1, wherein the selecting is further based on a normalized dot product of the first interest vector and the second interest vector.

6. The method of claim 1, wherein the new content item is an advertisement.

7. The method of claim 1, wherein the information is accessed from a storage.

8. A method comprising:
    transmitting a plurality of content items to a plurality of user devices associated with a plurality of user groups;
    accessing information indicating the plurality of user groups;
    determining, for each user group of the plurality of user groups, a topic importance value for a content topic associated with an indicated content item, wherein the topic importance value is based on:
        a quantity of members, of each user group, who are interested in the content topic; and
        a total quantity of content topics of interest to each user group; and
    transmitting, based on the topic importance values associated with the content topic, the indicated content item to an initial user group and to one or more additional user groups.

9. The method of claim 8, wherein, for each user group of the plurality of user groups, the topic importance value associated with the content topic is based on a ratio of:

a binary indication of whether at least one user of the user group is interested in the content topic; and a sum of binary values associated with the user group, wherein each of the binary values indicates whether at least one user of the user group is interested in a different content topic of a plurality of content topics.

10. The method of claim 8, further comprising determining the one or more additional user groups based on a topic uniqueness value associated with the content topic, wherein the topic uniqueness value is based on a logarithm of a ratio of:

a quantity of user groups within the plurality of user groups; and a sum of binary values associated with the content topic, wherein each of the binary values indicates whether at least one user of a different user group, of the plurality of user groups, is interested in the content topic.

11. The method of claim 8, further comprising determining the one or more additional user groups based on a vector representation of the initial user group and a vector representation of a second user group of the plurality of user groups.

12. The method of claim 8, further comprising determining the one or more additional user groups based on a similarity between:

a vector representation, of the initial user group, comprising the topic importance value associated with the content topic; and a vector representation, of a second user group of the plurality of user groups, comprising a second topic importance value associated with the content topic.

13. The method of claim 8, further comprising determining the one or more additional user groups based on a similarity between:

a vector representation, of the initial user group, comprising a topic uniqueness value associated with the content topic; and a vector representation, of a second user group of the plurality of user groups, comprising the topic uniqueness value associated with the content topic.

14. The method of claim 8, wherein transmitting the indicated content item is further based on a request for transmission of the indicated content item, and wherein the request identifies interests of target recipients of the requested transmission.

15. The method of claim 8, wherein the indicated content item is an advertisement.

16. The method of claim 8, wherein the information is accessed from a storage.

17. A method comprising:

receiving a request for transmission of an indicated content item, wherein the request identifies interests of target recipients of the requested transmission;

determining, based on information indicating a plurality of content topics and for each content topic of the plurality of content topics, a topic uniqueness value, wherein the topic uniqueness value associated with the content topic is based on a ratio of a total quantity of user groups and a quantity of subsets of the user groups that are interested in the content topic;

determining one or more additional user groups based on a similarity value between a first vector and a second vector, wherein the first vector and the second vector are based on content topics comprising topic uniqueness values greater than a minimum topic uniqueness value; and transmitting, based on the request and the topic uniqueness value associated with the content topic and the indicated content item, the indicated content item to an initial user group and one or more additional user groups.

18. The method of claim 17, wherein the topic uniqueness value associated with the content topic is based on a logarithm of a ratio of:

a quantity of user groups within a plurality of user groups; and a sum of binary values associated with the content topic, wherein each of the binary values indicates whether at least one user of a different user group, of the plurality of user groups, is interested in the content topic.

19. The method of claim 17, further comprising determining the one or more additional user groups based on a topic importance value associated with the content topic, of the plurality of content topics, and a user group, of a plurality of user groups, wherein the topic importance value is based on a ratio of:

a binary indication that at least one user of the user group is interested in the content topic; and a sum of binary values associated with the user group, wherein each of the binary values indicates whether at least one user of the user group is interested in a different content topic of the plurality of content topics.

20. The method of claim 17, wherein the indicated content item is an advertisement.

21. The method of claim 17, further comprising accessing the information from a storage.

* * * * *